May 26, 1936. I. M. WELLS ET AL. Re. 19,987

ROAD WORKING MACHINE

Original Filed Nov. 2, 1931 7 Sheets-Sheet 1

INVENTORS.

Ira M. Wells

Howard A. Olds

By Harry Schroeder

ATTORNEYS.

May 26, 1936. I. M. WELLS ET AL Re. 19,987

ROAD WORKING MACHINE

Original Filed Nov. 2, 1931 7 Sheets-Sheet 2

INVENTORS.
Ira M. Wells
Howard A. Olds
By Harry Schroeder
ATTORNEYS.

May 26, 1936. I. M. WELLS ET AL Re. 19,987

ROAD WORKING MACHINE

Original Filed Nov. 2, 1931 7 Sheets-Sheet 3

INVENTORS.
Ira M. Wells
Howard A. Olds
By Harry C. Schroeder
ATTORNEYS.

May 26, 1936. I. M. WELLS ET AL Re. 19,987

ROAD WORKING MACHINE

Original Filed Nov. 2, 1931 7 Sheets-Sheet 4

INVENTORS
Ira M. Wells
Howard A. Olds
By Harry C. Schroeder
ATTORNEYS.

ROAD WORKING MACHINE

Original Filed Nov. 2, 1931 7 Sheets-Sheet 5

INVENTORS.

Ira M. Wells
Howard A. Olds

By Harry C. Schroeder
ATTORNEYS.

ROAD WORKING MACHINE

Original Filed Nov. 2, 1931 7 Sheets-Sheet 6

INVENTORS.
Ira M. Wells
Howard A. Olds
By Harry C. Schroeder
ATTORNEYS.

May 26, 1936. I. M. WELLS ET AL Re. 19,987

ROAD WORKING MACHINE

Original Filed Nov. 2, 1931 7 Sheets-Sheet 7

INVENTORS.
Ira M. Wells
Howard A. Olds
By Harry C. Schroeder
ATTORNEYS.

Reissued May 26, 1936 Re. 19,987

UNITED STATES PATENT OFFICE 19,987

ROAD WORKING MACHINE

Ira M. Wells, Oakland, and Howard A. Olds, San Francisco, Calif.

Original No. 1,868,648, dated July 26, 1932, Serial No. 572,500, November 2, 1931. Application for reissue March 21, 1934, Serial No. 716,685

4 Claims. (Cl. 180—44)

This invention is a power driven road working machine adapted for operation with various kinds of road working equipment.

The objects of the invention are as follows:

First, to provide a power driven road working machine which can be utilized for various road working and maintenance operations.

Second, to provide a power driven road working machine with driving means for all wheels both front and rear.

Third, to provide a power driven road working machine with driving means for all wheels, both front and rear and providing leanable rear wheels and steerable front wheels.

Fourth, to provide a power driven road working machine which is pivotally supported transversely of the front axle.

Fifth, to provide a power driven road working machine with means for providing the same speeds in both directions of travel, all transmission gear combinations being adaptable for either forward or reverse propulsion of the vehicle.

Sixth, to provide a power driven road working machine which may be adapted for use as a grader, scarifier, ripper, scraper (either push or load carrying), drag, bull-dozer, backfiller, drag maintainer or plow by providing the proper attachments and units.

Seventh, to provide a device as outlined with means for steering the vehicle, leaning the rear wheels, adjusting the road working devices, driving the vehicle and forward and reverse speed shifting, all of said means being accessible and operable from the driver's seat.

Other objects and advantages of the invention will become apparent as the following description is read on the drawings forming a part of this specification and in which similar reference characters are used to designate similar parts throughout the several views and in which.

Figure 1:
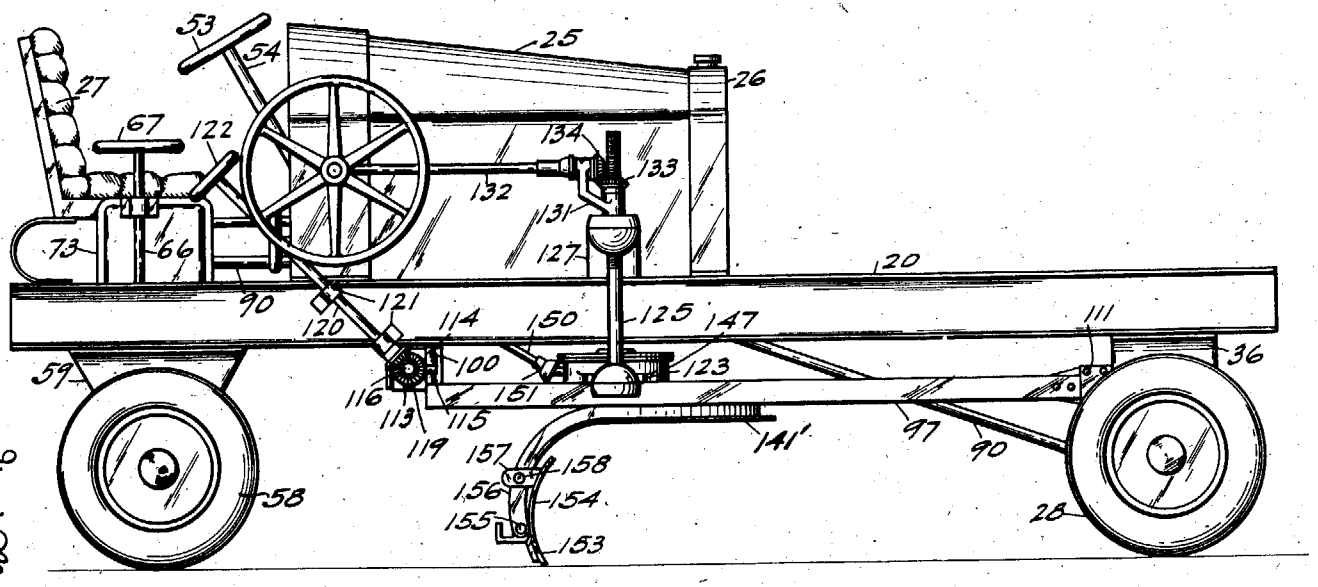
Figure 1 is a side elevation of the invention, fitted as a scraper.

The frame may be of any suitable construction and is indicated as consisting of channel side members 20 and 21 and channel cross members 22.

A motor 23 is suitably mounted on the frame and is provided with the usual transmission 24, hood 25, and radiator 26. A suitable seat 27 is provided for the driver of the vehicle and is preferably mounted on springs.

The front wheels 28 are driven through universal joints 29 preferably of the ball and socket type which are vertically pivoted at 30 to permit steering of the vehicle. The axle housing 31 is of standard construction throughout with the exception of forwardly and rearwardly extending journals 32 and 33 which are integral with the differential housing 34, the journal 33 being formed on the drive-pinion shaft housing 35.

The front axle bracket 36 is fixedly secured to the frame side members 20 and 21 and has a yoke 37 formed at the lower end, the arms of the yoke terminating in bearings 38 in which the journals 32 and 33 are pivotally mounted. Thus as will be understood the front axle and housing therefor, while fixedly secured to the frame in a vertical plane passing through the longitudinal pivotal axis defined by the journals 32 and 33, are at the same time arranged for vertical displacement at the ends thereof relative to the frame and substantially about the horizontal longitudinal center line of the differential. In this manner a free transverse rocking of the front axle and wheel is provided while the frame is rigidly mounted against longitudinal tilting on the front axle housing.

The steering mechanism for the front wheels consists of the steering arms 39 and 40 which are fixed in the knuckles 29 and are connected together at their outer ends by a connecting rod 41. Integral with lever 40 is a ball joint 42. Integral with, and extending to the left of the rear arm of the yoke 37 is a bracket 43 in which a vertical shaft 44 is rotatably mounted, the shaft having fixedly secured at its lower end, a lever 45 provided at its outer end with a ball joint 46, a connecting rod 47 cooperating between the ball joints 42 and 46. Fixed to the upper end of shaft 44 is a worm gear 48 which cooperates with a worm 49, the gear and worm being enclosed in a housing 50 which is mounted on the bracket 36. Worm 49 is secured on a shaft 51 which is provided with suitable bearings 52. The steering wheel 53 and steering column 54 are of the usual construction, the steering wheel cooperating with shaft 51 through bevel gears 55 or other suitable means.

Turning of the steering wheel 53 rotates shaft 51 and coincidently worm 49 which cooperates with worm gear 48, rotating shaft 44 with lever 45, which through rod 47 communicates the movement to the steering knuckles 29, the ball joints 42 and 46 permitting rocking motion of the frame relative to the axle housing.

The rear axle housing 56 is of similar construction to the front axles with the exception that the knuckles 57 are horizontally pivoted to permit leaning of the rear wheels 58 as indicated by the dotted lines, and the housing is fixedly secured to the axle bracket 59 as indicated at 60.

The leaning mechanism consists of the usual steering arms 61 which are secured in the knuckles 57 which are pivoted at 62, the arms 61 being connected together by a connecting rod 63 which has a thread formed throughout a portion of its length and on which a worm gear 64 is threadedly mounted on connecting rod 63 and cooperates with a worm 65 which is secured on a vertical shaft 66 which has secured at its upper end a handwheel 67. The worm gear 64 and worm 65 are mounted in a housing 68 which is vertically slidable as indicated at 69 and non-rotatable, the shaft 66 being slidable and rotatable in bearing 70.

By rotating the handwheel 67, worm gear 64 is rotated by cooperation with worm 65, the worm gear 64 cooperating with the threaded connecting rod 63 and being secured against sidewise movement, will cause the wheels to lean as indicated by the dotted lines, the arcuate motion of the lever ends being compensated for by the sliding of the housing 64.

The drive for the front and rear wheels consists of the usual motor 23 and transmission 24 with drive shaft 71 which is coupled to a reversing shaft 72.

The driving box consists of a housing 73 in which the reversing shaft 72 is rotatably mounted and on which a pair of bevel pinions 74 and 75 are rotatably and non-slidably mounted and which are provided with jaws to cooperate with a clutch block 76 which is slidably and non-rotatably mounted on the shaft 72. A shifter form 77 secured to a rod 78 cooperates with the clutch block 76, and a shift lever 79 pivoted at 80 and cooperating with rod 78 at 81.

A bevel gear 82 is in contsant mesh with pinions 74 and 75 and is adapted to be driven in opposite directions respectively by these pinions, and is fixedly secured at one end of the rear drive-pinion shaft 83 and which is mounted in a suitable bearing 84, the shaft 83 driving the rear wheels through the usual drive pinion 85, master gear 86 and differential (not shown), axles 87, and through universal joints in the knuckles 57.

The drive for the front wheels is taken off shaft 83 through a pair of mitre gears 88 and 89, the gear 88 being fixed on shaft 83 and gear 89 being fixed on the front wheel drive shaft 90 which is suitably mounted in bearings 91 and 92 and provided with suitable universal joints 93, driving through a drive pinion 94, master gear 95, differential (not shown), shafts 96, through universal joints in knuckles 29 to the front wheels 28.

The draft frame is of substantially triangular construction, having backwardly diverging draft bars 97 and 98 and a transverse member 99 connecting the rearward ends of the bars. A vertical shoe 100 is intermediately secured on the transverse member 99 for cooperation with the transverse adjusting means.

The draft frame universal coupling consists of a pin 101 having spaced annular shoulders 102 and 103 and a ball end 104, which is seated in a spherical bore 105 in the front bracket 36. A cylindrical cap 106 having a flange 107 is bolted over the ball as indicated at 108.

The pin 101 is secured to the draft frame by clamping between cooperating clamp members 109 and 110 by means of bolts 111, the shoulders 102 and 103 straddling the clamp members. Integral with clamp members 109 and 110 are extensions 111 and 112 which are riveted to the draft bars 97 and 98. By this means universal adjustment of the draft frame is permitted.

Transverse adjustment of the draft frame is provided by means of a nut 113 having a flat face 114 cooperating with the rear surface of shoe 100 and having forwardly extending pins 115 which straddle the shoe 100. The nut 113 is threadedly mounted on a screw 116 which is rotatably mounted in bearings 117 which are mounted on a cross-member 118 which in turn is secured to the frame side members 20 and 21. A pair of mitre gears 119 are respectively secured to the end of screw 116 and adjusting shaft 120, the adjusting shaft 120 being rotatably mounted in bearings 121 and having a handwheel 122 fixedly secured at the upper end. By this arrangement, angular and vertical adjustment of the draft frame is permitted irrespective of the transverse adjustment, as the draft connection is universal and the shoe 100 may assume any angular relation to the nut 113.

Vertical adjustment of the draft frame is provided through a cross-member 123 which is secured to the draft frame and which is provided with ball seats at its opposite end to receive the ball-ends 124 of adjusting screws 125, a pin 126 cooperating with a slot in the ball seat to prevent rotation of the screw.

A supporting member 127 which may also be utilized as a motor support is secured across the top of frame side members 20 and 21 and has a spherical seat at each end for cooperation with a ball member 128 which is also provided with a pin 129 cooperating with a slot 130 in the seat, to prevent rotation of the member 128. A bracket 131 integral with member 128 forms a bearing for the adjusting shaft 132.

The screw 125 is slidable in ball member 128 and a mitre gear 133 has a threaded bore cooperating with the screw. A mating mitre gear 134 is secured on the end of shaft 132. The other ends of shafts 132 are fitted with mitre gears 135 and suitably mounted in bearings 136, the shafts being provided with suitable universal joints 137. Cooperating with mitre gears 134 are mitre gears 138 which are secured to the handwheels 139 and 140 and rotatable on stub shafts secured in brackets 141. Shafts 132 are also provided with telescopic members to compensate for difference in distance between the centers of gears 133 and 138 due to transverse adjustment of the draft frame.

It will be noted that by means of handwheels 139 and 140 any vertical or angular adjustment of the draft frame may be obtained.

The semi-circle 141[1] has a cross member 142 in which a pivot pin 143 is fixedly secured, and is supported at the forward end by a shoe 144 which is mounted on a cross-member 145 secured to the draft frame. A bearing 146 in cross-member 123 rotatably receives the pin 143 and is centrally located between members 97 and 98.

A worm gear housing 147 is integral with the cross-member 123, the worm gear 148 being secured to the upper end of pin 143. A worm 149 cooperates with the worm gear 148 and is secured on an adjusting shaft 150 which is provided with suitable universal joints 151, the shaft being provided with suitable bearings and a handwheel 152.

Figure 2:
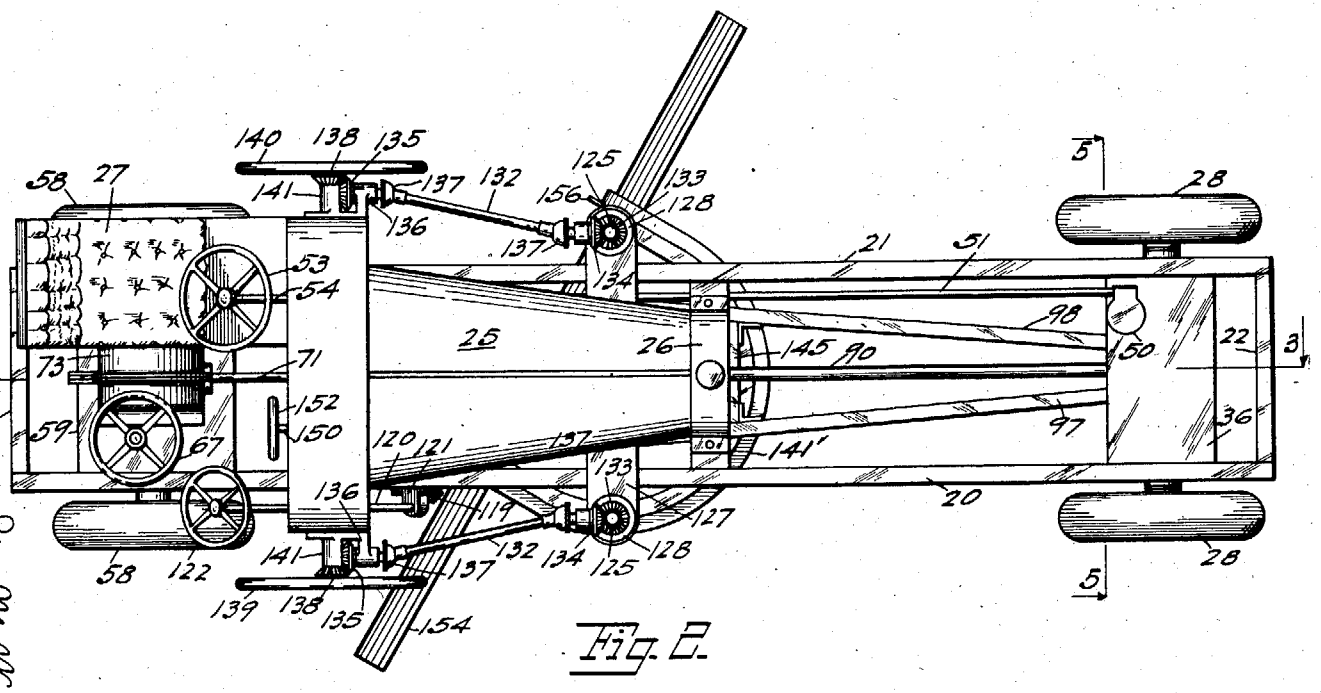
Figure 2 is a plan view of the invention corresponding to Figure 1 as to equipment.
Figure 3:
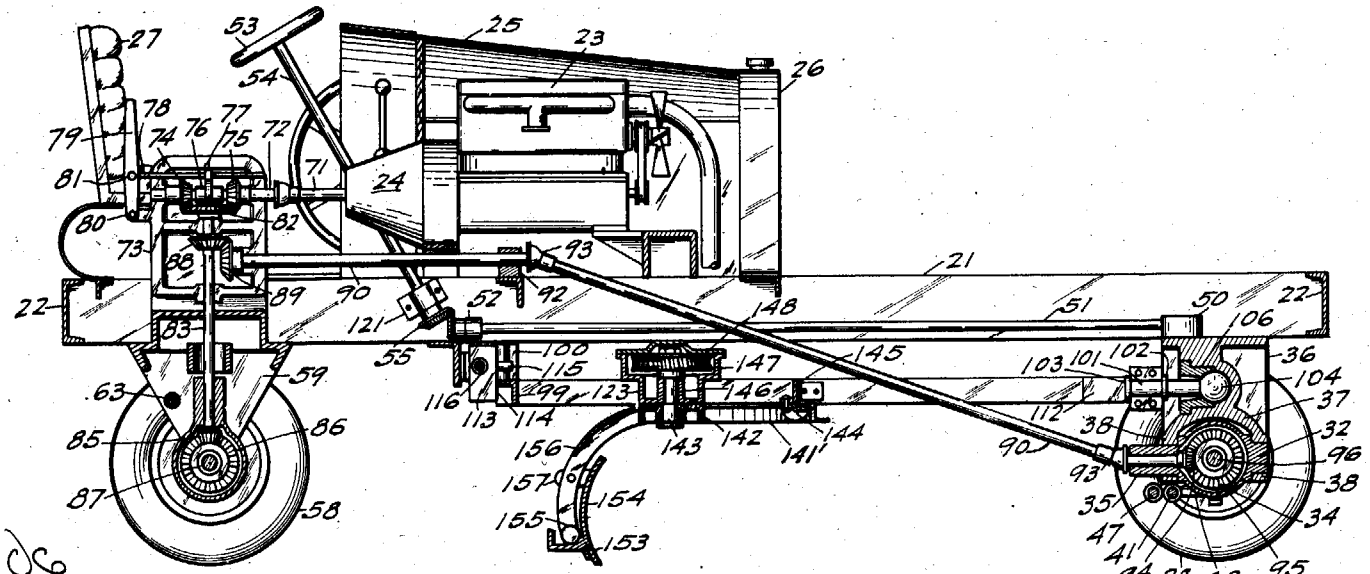
Figure 3 is a longitudinal sectional elevation taken on the center line indicated at 3—3 on Figure 2.
Figure 4:
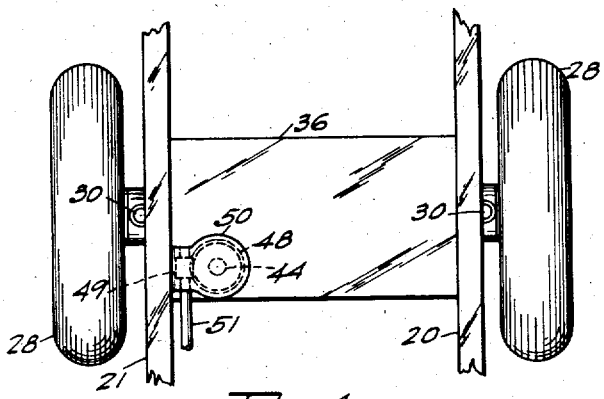
Figure 4 is a fragmentary plan view showing the front axle bracket and front wheels.
Figure 8:
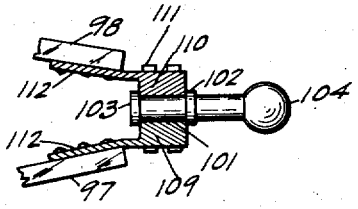
Figure 8 is a sectional view taken on line 8—8 of Fig. 7.
Figure 5:
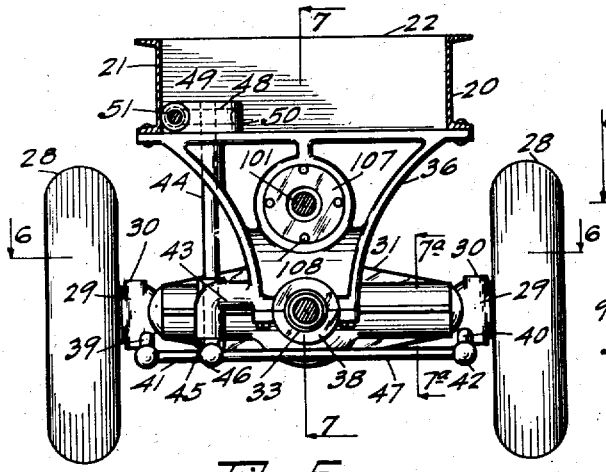
Figure 5 is a section taken on line 5—5 of Fig. 2.
Figure 7:
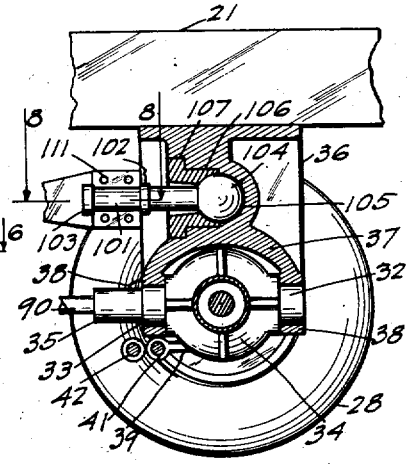
Figure 7 is a section taken on line 7—7 of Fig. 5, the axle housing being cut at line 7a—7a of Figure 5.
Figure 6:
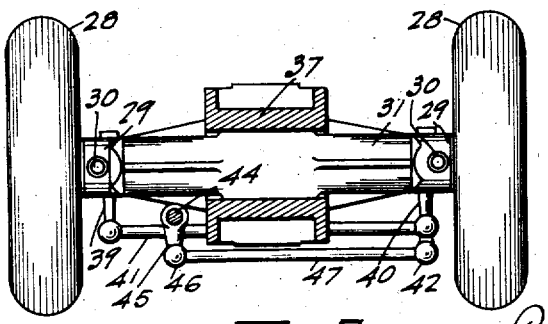
Figure 6 is a section taken on line 6—6 of Fig. 5.
Figure 11:
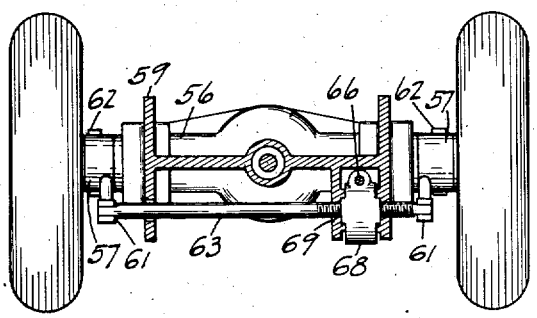
Figure 11 is a section taken on line 11—11 of Fig. 9.
Figure 9:
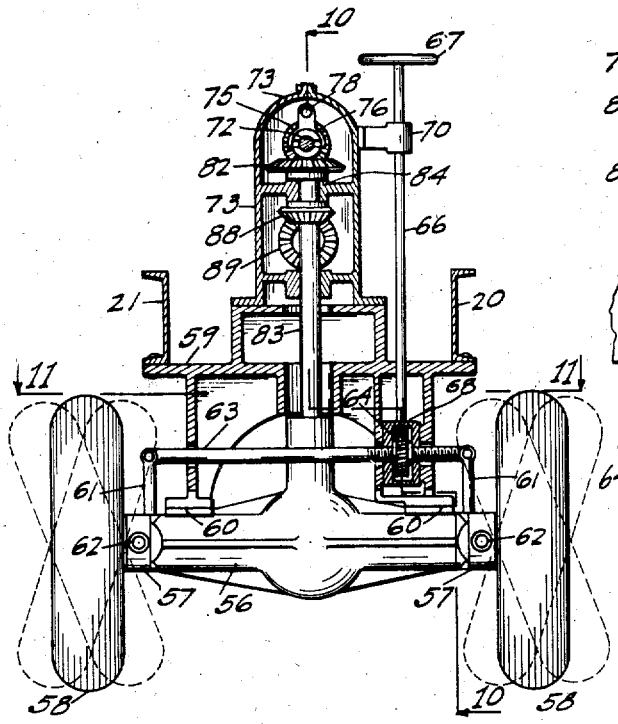
Figure 9 is a section taken on line 9—9 of Fig. 10.
Figure 10:
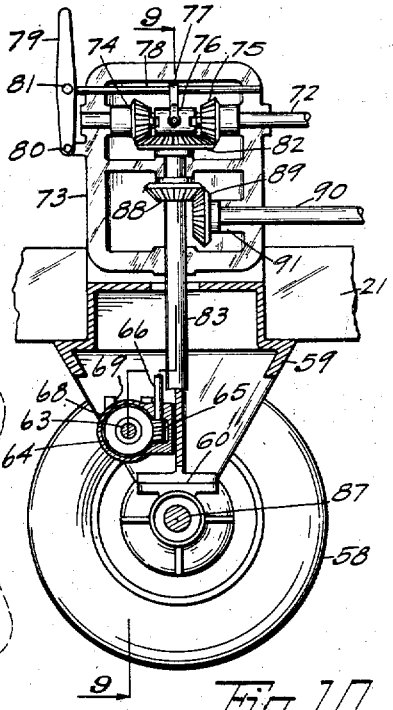
Figure 10 is a section taken on line 10—10 of Fig. 9.
Figure 12:
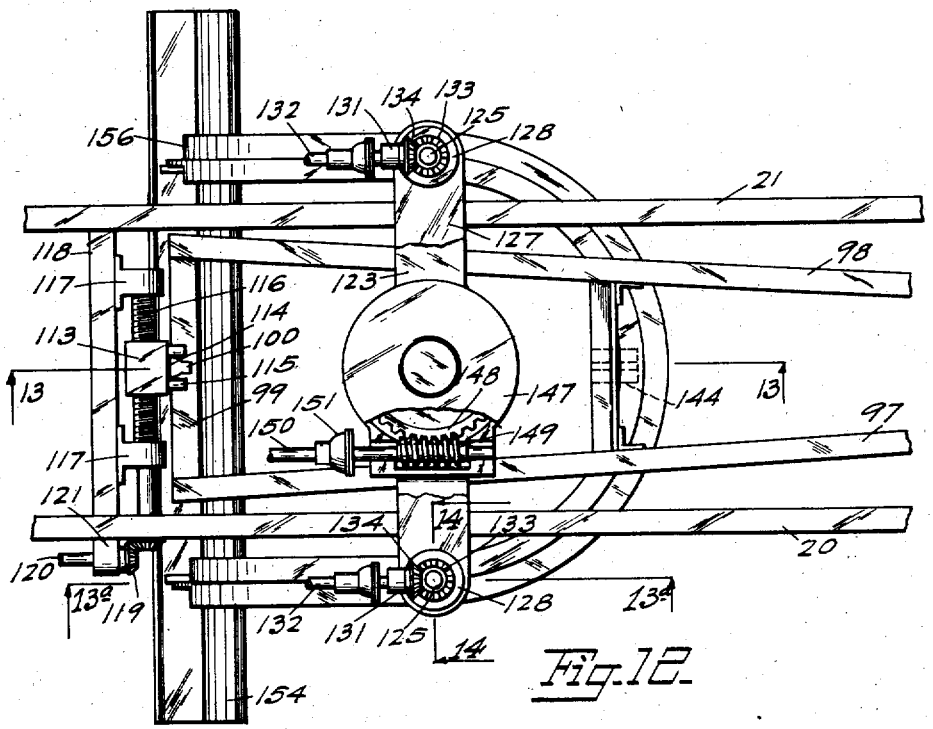
Figure 12 is a fragmentary plan view showing the draft bars and adjusting means, and the semi-circle and adjusting means.
Figure 13:
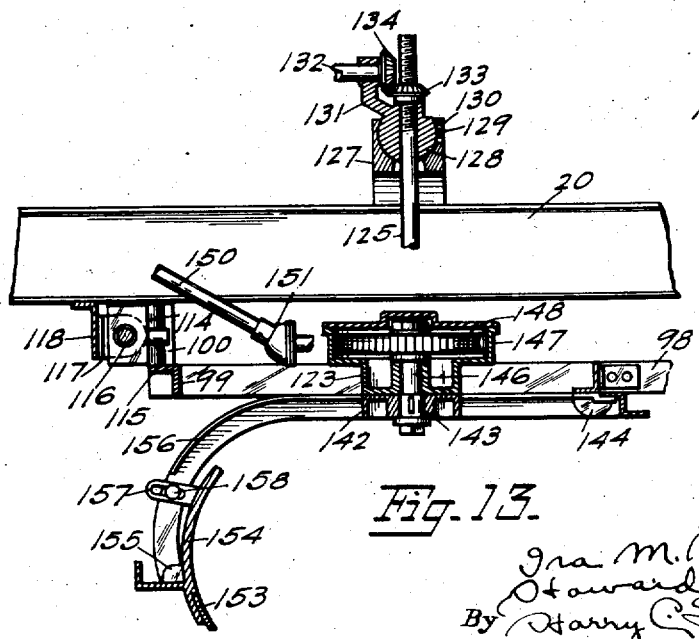
Figure 13 is a section taken on line 13—13 of Figure 12, with the right hand frame member shown full and the draft bar vertical adjustment shown in section corresponding to line 13a—13a of Figure 12.
Figure 14:
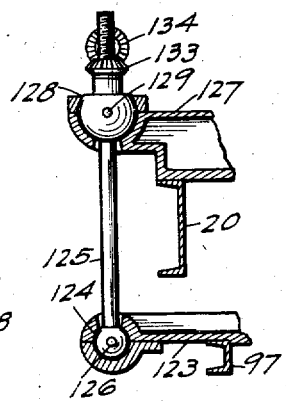
Figure 14 is a section taken on line 14—14 of Fig. 12.

By rotating handwheel 152 the semi-circle may be adjusted to any desired angle such as is shown in Figure 2. By means of the semi-circle adjustment, and draft frame, vertical and angular adjustment and transverse adjustment, any desired adjustment of the semi-circle may be obtained.

The scraper consists of the usual blade 153, secured to a curved mold board 154 which is mounted by means of a ball and socket connection 155 on the depending members 156 of the semi-circle 141. Adjustment of the mold board is provided by means of brackets 157 having slots and bolts 158.

Figure 15:
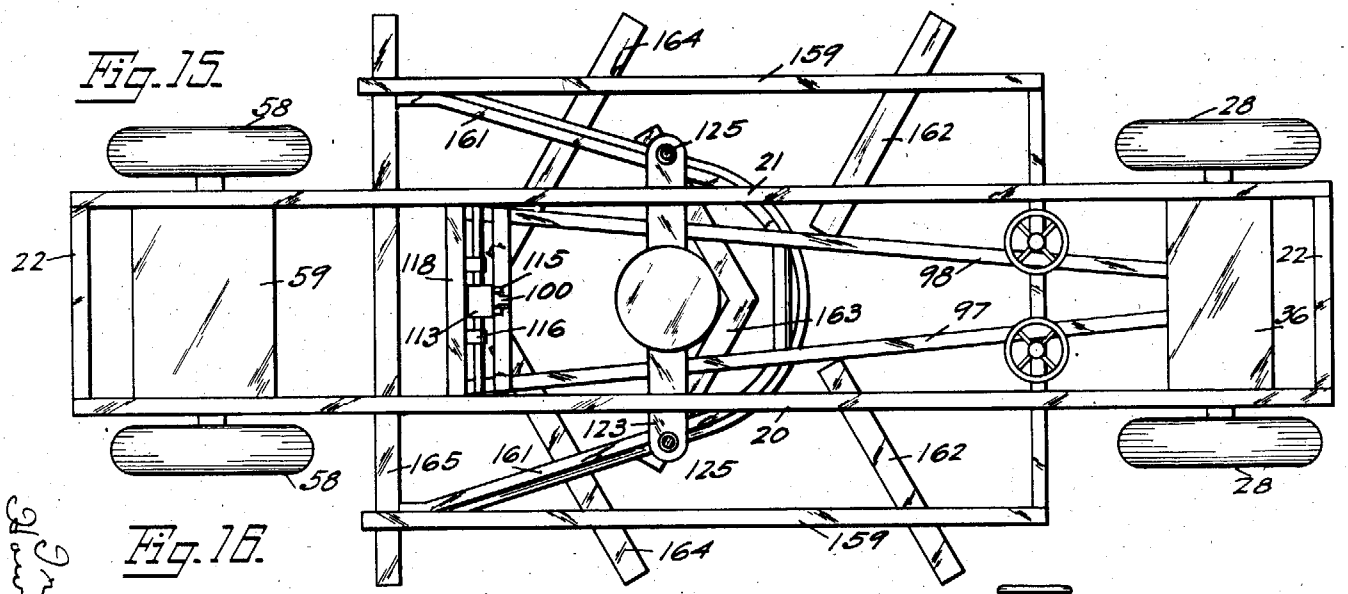
Figure 15 is a plan view of the chassis showing a drag maintainer installed thereon.
Figure 16:
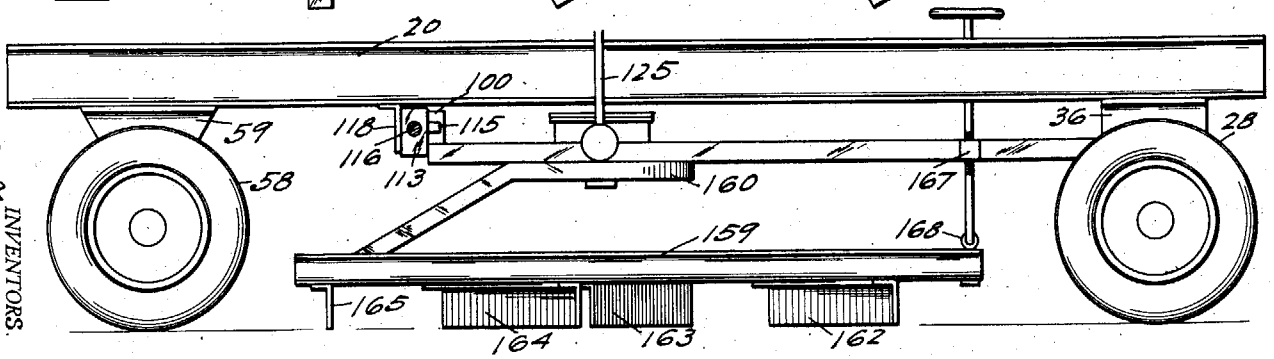
Figure 16 is a side elevation of Figure 15.

Adaptability of the invention for use with various road working attachments is indicated in Figures 15 and 16 in which a drag maintainer consisting of frame side members 159 are supported by the draft frame through a special semi-circle 160 which replaces the semi-circle shown in the other views, the depending ends 161 being secured adjacent the rearward end of the frame side members.

The blades consist of a pair of diagonal gathering blades 162 which are followed by a V shaped spreading blade 163, which in turn is followed by a second pair of gathering blades 164, thence by a transverse blade 165, suitable front adjustment being provided by means of screws 166 operating in a threaded bearing 167, the eyes 168 being swivelly mounted in the frame.

Similarly, bulldozers, load carrying scrapers, drags, and other equipment may be mounted on the front or rear axle brackets, cross members 22, frame side members 20 and 21, draft frame or semi-circle to suit conditions.

It will be noted that variations in construction and arrangement of parts which are consistent with the appended claims may be resorted to without detracting from the spirit or scope of the invention or sacrificing any of the advantages thereof.

We claim:

1. In combination, a frame, a power unit mounted on said frame, supporting brackets at each end of said frame, a rear axle housing fixedly secured to one of said brackets, a front axle housing transversely pivoted to the other bracket, a horizontally pivoted knuckle for each end of said fixed axle housing and controlling means therefor, a vertically pivoted knuckle for each end of said pivoted axle housing and controlling means therefor, wheels mounted on each of said knuckles and means for transmitting power from said power unit to all of said wheels.

2. In combination, a frame, a power unit mounted on said frame, supporting brackets at each end of said frame, a rear axle housing fixedly secured to one of said brackets, a front axle housing transversely pivoted to the other bracket, a horizontally pivoted knuckle for each end of said fixed axle housing and controlling means therefor, a vertically pivoted knuckle for each end of said pivoted axle housing and controlling means therefor, wheels mounted on each of said knuckles, a transmission and reversible means for transmitting power from said transmission to all of said wheels.

3. In a machine of the character described, a body frame, a power unit mounted thereon, supporting brackets adjacent the front and rear ends of the frame, a power driven rear axle and wheels therefor driven by said unit, a housing for said axle fixedly secured to one of said brackets, a power driven front axle and wheels therefor driven by said unit, a housing for said front axle transversely pivoted at opposite sides of said housing to the other bracket for affording vertical movement of said front wheels independent of said frame, and a vertically pivoted knuckle for each end of said front axle housing connected to the adjacent front wheel for permitting steering of the latter.

4. In a machine of the character described, a body frame, a power unit mounted thereon, a power driven rear axle and wheels therefor driven by said unit, a housing for said axle secured to said frame, a power driven front axle and wheels therefor driven by said unit, a housing for said front axle transversely pivoted at opposite sides of said housing to said frame for affording vertical movement of said front wheels independent of said frame, and a vertically pivoted knuckle for each end of said front axle housing connected to the adjacent front wheel for permitting steering of the latter.

IRA M. WELLS.
HOWARD A. OLDS.